United States Patent
Hu et al.

(10) Patent No.: US 8,184,551 B2
(45) Date of Patent: May 22, 2012

(54) THROUGHPUT-BASED RATE ADAPTATION FOR WIRELESS TRANSMISSIONS

(75) Inventors: Chunyu Hu, Cupertino, CA (US); George Kondylis, Palo Alto, CA (US); Simeon Furrer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 530 days.

(21) Appl. No.: 12/395,107

(22) Filed: Feb. 27, 2009

(65) Prior Publication Data

US 2010/0034106 A1 Feb. 11, 2010

Related U.S. Application Data

(60) Provisional application No. 61/087,516, filed on Aug. 8, 2008.

(51) Int. Cl.
*H04L 12/26* (2006.01)
(52) U.S. Cl. ........ 370/252; 370/329; 455/69; 455/452.2
(58) Field of Classification Search .................. None
See application file for complete search history.

(56) References Cited

U.S. PATENT DOCUMENTS

| | | | |
|---|---|---|---|
| 2005/0128954 A1* | 6/2005 | Li et al. | 370/252 |
| 2005/0160181 A1* | 7/2005 | Kwon et al. | 709/238 |
| 2006/0146705 A1* | 7/2006 | Waxman | 370/230 |
| 2008/0186917 A1* | 8/2008 | Wu et al. | 370/331 |

* cited by examiner

*Primary Examiner* — Chi H. Pham
*Assistant Examiner* — Shick Hom
(74) *Attorney, Agent, or Firm* — Sterne, Kessler, Goldstein & Fox P.L.L.C.

(57) ABSTRACT

A system and method of throughput-based transmission rate adaptation for wireless transmissions is provided. An adapted transmission rate is determined based on transmission feedback from previous wireless frame transmissions. The adapted transmission rate is determined by comparing nominal throughputs derived from packet success rate (PSR) estimates at the current rate and other rates, such that the adapted transmission rate chosen is one that maximizes the nominal throughput. The PSR estimates can include those associated with the current rate, a fallback rate, and other rates. The PSR estimates are updated after each frame transmission. The PSR estimates can be saved and used for calculating future estimates, and they can also be time-stamped so as not to use them if they are older than a predetermined age.

33 Claims, 13 Drawing Sheets

EXPONENTIAL MOVING AVERAGE

794 —  $PSR_n = \beta * PSR_{n-1} + (1 - \beta) * PSR_t$

Where

- $PSR_n$ represents a new packet success rate estimate, where n is an estimate number counter that starts from zero and is reset to zero when the current rate changes;
- $\beta$ represents an aging factor between 0 and 1, where $(1 - \beta) = 2^{-\alpha}$, and where $\alpha$ is a first value if n is smaller than a predetermined value, and $\alpha$ is a second value if n is larger than or equal to the predetermined value:

2-Stage Parameter --- $\alpha = \alpha_0$ if n < threshold, else $\alpha_1$;

- $PSR_{n-1}$ represents a previous packet success rate estimate; and
- $PSR_t$ represents a current packet success rate measurement that is equal to a ratio of the number of successful packet transmissions and the total number of packet transmissions, multiplied by $2^{NF}$, where NF is a normalization factor:

$PSR_t = (SUCCESSFUL / TOTAL) * 2^{NF}$

FIG. 7

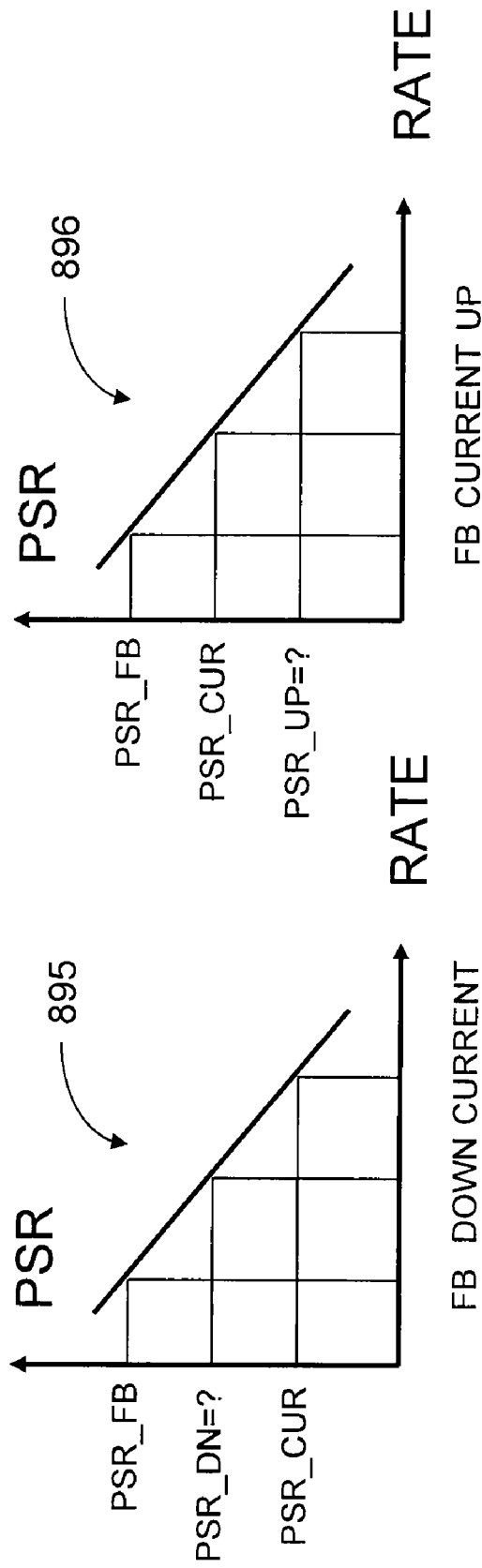

HISTORY INFORMATION

WHEN INCREASING THE RATE: — 997
- PSR_CUR(NEW) ← PSR_UP(OLD)
- PSR_DN(NEW) ← PSR_CUR(OLD)
- PSR_FB(NEW) ← PSR_DN(OLD)

FIG. 9A

WHEN DECREASING THE RATE: — 998
- PSR_UP(NEW) ← PSR_CUR(OLD)
- PSR_CUR(NEW) ← PSR_DN(OLD)
- PSR_DN(NEW) ← PSR_FB(OLD)

FIG. 9B

THROUGHPUT-BASED RATE ADAPTATION FOR WIRELESS TRANSMISSIONS

CROSS REFERENCE TO RELATED APPLICATIONS

This application claims the benefit of U.S. Provisional Patent Application No. 61/087,516, filed on Aug. 8, 2008, titled "Throughput-Based Rate Adaptation for Wireless Transmissions", which is incorporated herein by reference in its entirety.

BACKGROUND OF THE INVENTION

1. Field of the Invention

The present invention relates generally to wireless frame transmissions.

2. Background Art

Wireless devices can transmit and receive data in the form of frames. A frame is a basic message unit for communication across a network, e.g., a wireless network. A frame can include routing information, data, and error detection information. Depending on the physical layer (PHY) protocol, a frame can be transmitted at various rates, e.g., the IEEE 802.11a PHY supports the rate set {6, 12, 18, 24, 36, 48, 54} Mbits/s. In general, the larger the distance between the transmitter and the target receiver, the lower the rate, since the received signal strength is lower. On the other hand, wireless communications are prone to interfering signals caused by, for example, microwave ovens, cordless telephones, Bluetooth devices, and other wireless devices, operating at overlapping or neighboring frequency ranges. In such noisy environments, the transmission rate of frames tends to be low in order to improve throughput and maintain a low packet error rate (PER). However, a low transmission rate does not necessarily provide higher throughput.

Conventional methods exist for choosing a wireless transmission rate in order to achieve a low PER. One such known method uses PER as the performance criteria. This method raises or lowers the transmission rate if the PER at the current rate meets a prespecified PER threshold. The thresholds can be specified per-rate, and they are set to maintain an overall low PER (e.g., around 5%). This method assesses PER at the current transmission rate and does not necessarily estimate PER at other rates. The PER-based method can suffer in performance in presence of interference for the simple reason that the interference can raise the PER to a level across all rates, and that level is not pre-known and can be higher than the preconfigured threshold.

Another known method uses the received signal strength indication (RSSI) to determine which transmission rate to use. RSSI tells the strength of an incoming (received) signal at a wireless device. The RSSI method assumes reciprocity in the medium, and both wireless devices at the two end points of a link use the same level of transmission power. Thus, no matter which device transmits, the other one observes the same strength of the received signal. However, the transmission power depends on many factors, including but not limited to device vendors, channel, and rate. Thus, the latter assumption is hard to guarantee. Decisions made solely based on RSSI with regard to the transmission rate may not be optimal.

As explained above, both PER-based and RSSI rate adaptation methods have their respective cons. Therefore, a system and method for adapting a wireless transmission rate to improve throughput in both clean and noisy environments are desired.

BRIEF SUMMARY

A system and method of throughput-based transmission rate adaptation for wireless transmissions are provided. An adapted transmission rate is determined by comparing nominal throughputs derived from packet success rate (PSR) estimates at the current rate and at other rates, such that the adapted transmission rate chosen is the one that maximizes the nominal throughput. The PSR estimates of various rates can be obtained from previous frame transmission results, e.g., in the form of acknowledgement frames (ACKs).

Embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

Embodiments of the present invention will be described with reference to the accompanying drawings, wherein generally like reference numbers indicate identical or functionally similar elements. Also, generally, the leftmost digit(s) of the reference numbers identify the drawings in which the associated elements are first introduced.

FIG. 7 depicts an exponential moving average equation that can be used to estimate PSR, according to embodiments of the present invention.

FIGS. 8A and 8B depict graphs showing how linear interpolation and linear extrapolation can be used to estimate PSR, according to embodiments of the present invention.

FIGS. 9A and 9B depict how the PSR estimates can be updated when a transmission rate changes, according to embodiments of the present invention.

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Introduction

The present invention is directed to a system and method for throughput-based rate adaptation for wireless transmissions. The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Wireless communications systems, such as wireless-enabled laptop computers, personal digital assistants (PDAs), portable music players, portable televisions, cell phones, and similar mobile digital devices and mobile analog devices pose multiple challenges for design engineers and users alike.

Users in a wireless environment are typically mobile, and so may come in and out of range of wireless access points (APs). Not all APs may support the connections desired by a user, and not all APs provide optimal access (such as high speed wireless links). In addition, other environmental factors, such as interference and a constantly changing multipath environment, may also influence the quality and availability of network connections. Therefore, establishing, maintaining, and optimizing network connections and quality is an ongoing task.

This document presents a system and method for wireless transmission rate adaptation that maximizes throughput in a wireless local area network (LAN) in both clean and interference-laden environments. Because a throughput-based solution is provided, wireless transmissions are optimized in respect to throughput, efficiency and quality of service.

Exemplary Wireless Network

Figure 1B:
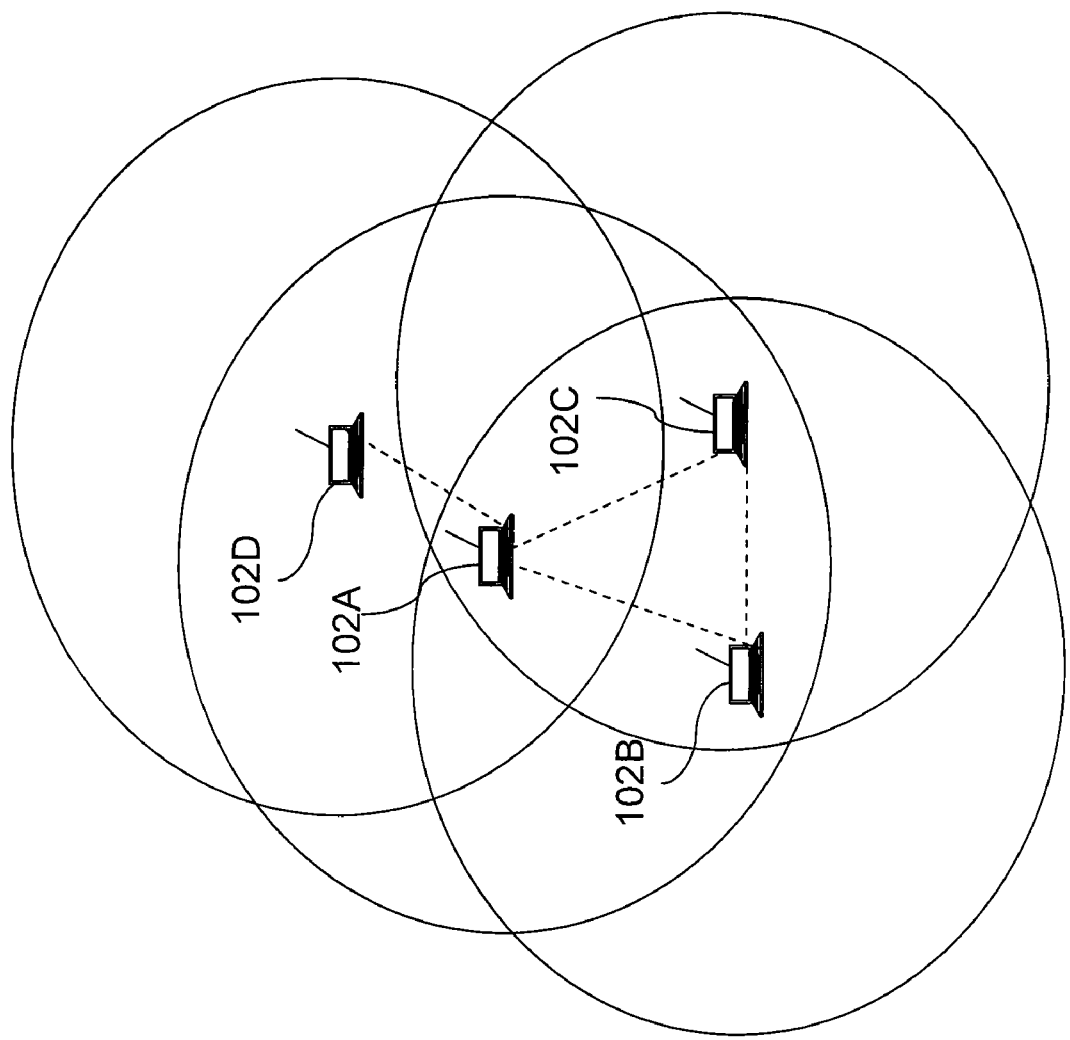
FIGS. 1A and 1B illustrate exemplary wireless networks.
Figure 1A:
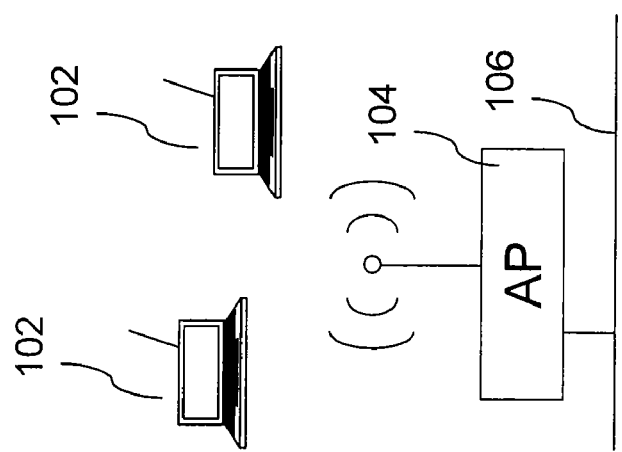

FIGS. 1A and 1B illustrate exemplary wireless network environments. In practical application, these exemplary network environments may be any kind of public or private space which are designed for wireless network access. Such environments may include, for example and without limitation, offices, airports, train stations, factories, internet cafés, any outdoor environment configured for wireless access, and similar environments.

The exemplary wireless network environments shown in FIGS. 1A and 1B may include one or more wireless devices 102 configured for user access to wireless networks. FIGS. 1A and 1B illustrate exemplary wireless devices 102 which may be, for example, a WiFi enabled mobile communications device including, for example and without limitation, a personal digital assistant (PDA), a laptop computer with built-in WiFi or a WiFi card, a portable music player, a wireless television receiver, a cell phone with WiFi-access, or one of many kinds of similar wireless devices. Other examples of wireless devices 102 may include various kinds of portable medical monitoring and reporting devices, a variety of portable communications devices used in law enforcement and/or military applications, location determination devices (such as those associated with the Global Positioning System (GPS)), and a variety of wireless technologies which may be used in various industrial and enterprise contexts for such purposes as inventory tracking and monitoring. A wireless device 102 may contain within, or have attached to it, a wireless communications module (not illustrated), or may have a port or card slot configured to access a wireless communications module.

The wireless network environment shown in FIG. 1A is a simplified depiction of an infrastructure environment in which one or more access points (APs) 104 are configured to transmit and receive network information (e.g., to/from network 106), and are configured to support a plurality of wireless devices 102. Examples of APs may include WiFi APs, cellular towers used in cell phone networks and other wireless applications, and similar distribution points for wireless signals. The group formed by AP 104 and the wireless devices 102 in its coverage area is a basic service set (BSS) or cell. Two or more BSSs can be linked to form an extended service set (ESS).

The wireless network environment shown in FIG. 1A may support one or more networks 106 which provide data to APs 104 for broadcast, and which also receive data from wireless devices 102 via APs 104. Persons skilled in the relevant arts will recognize that various hardware, not illustrated, may be required to support network activities in this network environment. Such hardware may include but is not limited to network servers, authentication servers, routers, modems, and various kinds of radio frequency (RF) equipment. Persons skilled in the relevant arts will further recognize that in some cases hardware associated with networks 106 may be substantially collocated with APs 104. In other cases, hardware associated with networks 106 may be remote from APs 104 and linked to APs 104 via cabling such as electrical cables or fiber optics cables.

For purposes of the present invention, networks 106 may be viewed as sources of data for wireless transmission by APs 104 and sinks for data received at APs 104, the latter data being received from wireless devices 102.

The wireless network environment shown in FIG. 1B is a simplified depiction of an independent BSS (IBSS) environment in which there are no separate APs. Instead, each of wireless devices 102 acts as both an AP and a client. The range of an IBSS environment depends on the ranges of each wireless device. As can be seen in the example shown in FIG. 1B, wireless devices 102A, 102B, and 102C are all within each others' wireless ranges. Wireless device 102D, however, is only within range of wireless device 102A.

It will be apparent to persons skilled in the relevant arts that between various APs 104 or wireless devices 102, the quality of service can vary. Quality of service factors for a network connection may include the speed of network connection, the security level of network connection, the types of services supported by a network connection, the connection reliability and bandwidth guarantees, and other factors which may affect the nature and quality of the network connection available to a user of a wireless device 102.

The above-named network connection factors can also vary depending not only on the particular AP or other wireless devices, but also depending on variable factors within the network environment. For example, movement of objects within a network environment can affect the link quality. In addition, factors entirely external to the network environment may affect network connections. For example, a given network may temporarily go offline for a variety of reasons (for example, due to power failures, disruptions in communications lines, network server crashes, problems with intermediary or linking networks, deliberate electronic network attacks, etc.), only to become available again at a later time.

As a result, for a user in a wireless network environment, the quality of network connections available to a user's wireless device 102 may vary over time, and may also vary as the user physically moves around in the network area. The user may have preferences among various network connections, with various priorities regarding those preferences. The user may be in proximity of other devices, such as microwave ovens, cordless telephones, Bluetooth devices, and other wireless devices, that may cause interference with their wireless signals. Consequently, it is desirable that wireless devices 102 be capable of adapting to a network environment which changes over time, and moreover wherein the nature and quality of network connections may change as the user moves.

Exemplary Wireless Device

Figure 2:
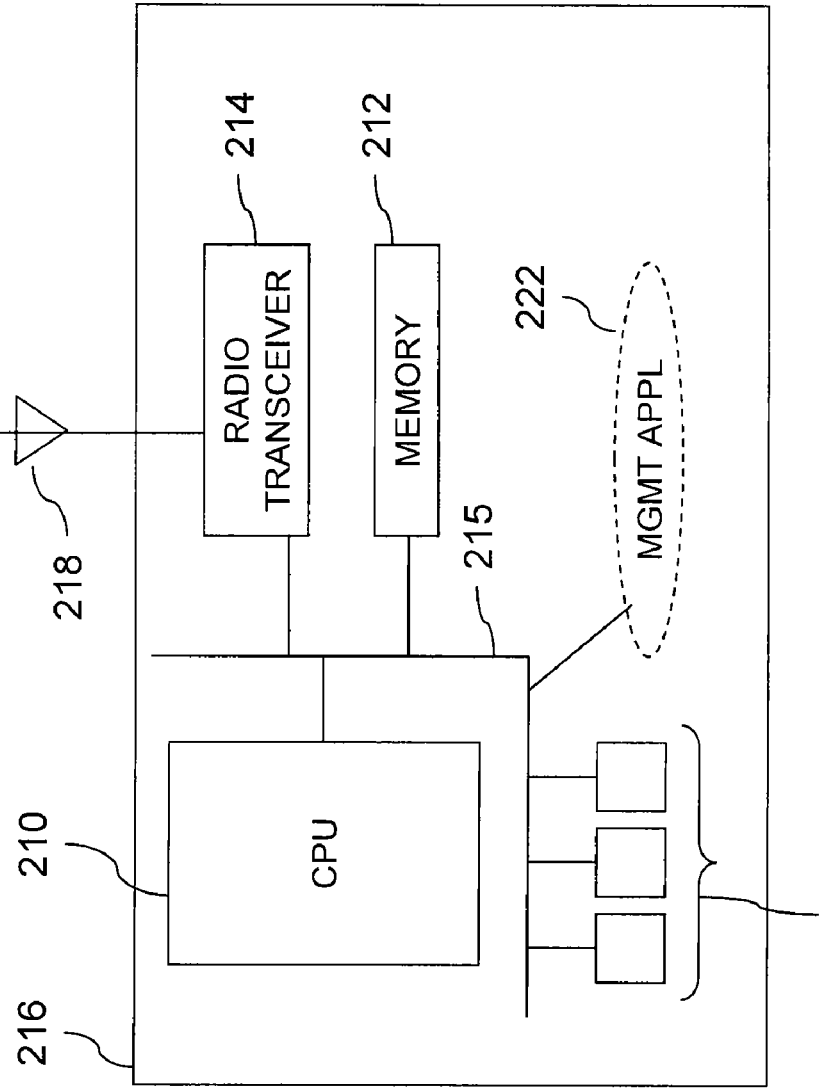
FIG. 2 illustrates an exemplary wireless device.

FIG. 2 is a block diagram of an exemplary wireless device 200 (such as wireless device 102 shown in FIGS. 1A and 1B), which may be, for example, a WiFi device or a WiFi-enabled device. Exemplary wireless devices may include devices that are enabled for communications based on the IEEE 802.11 communications protocol. The 802.11 protocols include the 802.11a/b/g/n protocols, as well as other related protocols which may currently be under development or may be forthcoming in the future, and which are specified in IEEE documents as is known to persons skilled in the relevant arts. The pertinent IEEE standards for 802.11a/b/g/n as of the filing date of this application are incorporated herein by reference as if the entire text were reproduced herein.

Exemplary wireless device 200 may comprise an exemplary central processing unit (CPU) 210, a memory 212, and a radio transceiver 214, which may structurally be contained in a surrounding exemplary case 216. Case 216 may also include any number of ports, buttons, control devices, or other user-interface elements, not illustrated. Exemplary wireless device 200 may also include an exemplary antenna 218, which may be either interior to or exterior to case 216. Radio transceiver 214 may be configured to modulate outgoing wireless messages for transmission via antenna 218. Radio transceiver 214 may be further configured to demodulate transmissions received via antenna 218. Exemplary wireless device 200 may also comprise any number of additional chips, elements, or components schematically represented as elements 220. Memory 212, radio transceiver 214, and elements 220 may be in communication with CPU 210, e.g., via bus 215.

These various exemplary components (CPU 210, memory 212, additional elements 220, radio transceiver 214, and antenna 218) can be connected to each other as necessary in order to support the operations of wireless communications. The connections between these components as illustrated in FIG. 2 are exemplary only, and other connections are possible. In some embodiments of the present system and method, one or more of these components may be on one or more separate chips or integrated circuits (ICs).

CPU 210 can be configured or programmed to perform a variety of high level tasks for the purpose of managing and establishing network associations between wireless device 200 and its network. These features, capabilities, and related programs may be implemented in a management application 222, which is further discussed below. The details of some of these exemplary network management operations, in particular transmission rate adaptation management, will be described further below in conjunction with FIGS. 3 through 13.

CPU 210 may perform any number of tasks pertaining to the general purpose or general operations of wireless device 200. For example, for a cell phone, CPU 210 may perform tasks related to digital signal processing and other management tasks related to sending and receiving a telephone call. For a general purpose laptop computer, CPU 210 may perform all the tasks necessary to support software running on the laptop computer.

CPU 210 may be further configured to support a variety of low level communications tasks. For example, CPU 210 may be configured to support those tasks which are typically associated with medium access control (MAC) operations in a communications device. CPU 210 may be configured to operate as a medium access control (MAC) via instructions stored in memory 212. In particular, management communications tasks discussed in further detail below may be encapsulated in an application or application software such as management application 222.

Management application 222 is illustrated in FIG. 2 with a dotted-line bubble, representing its role as software. Persons skilled in the relevant arts will recognize that management application 222 may be implemented via dedicated hardware, via firmware, and/or via device driver, and may be embodied and implemented via one or more of CPU 210, and/or memory 212, along with possibly other components. Management application 222 may be implemented as a computer program product implemented on a computer readable medium that causes CPU 210 to implement various instructions.

Figure 3:
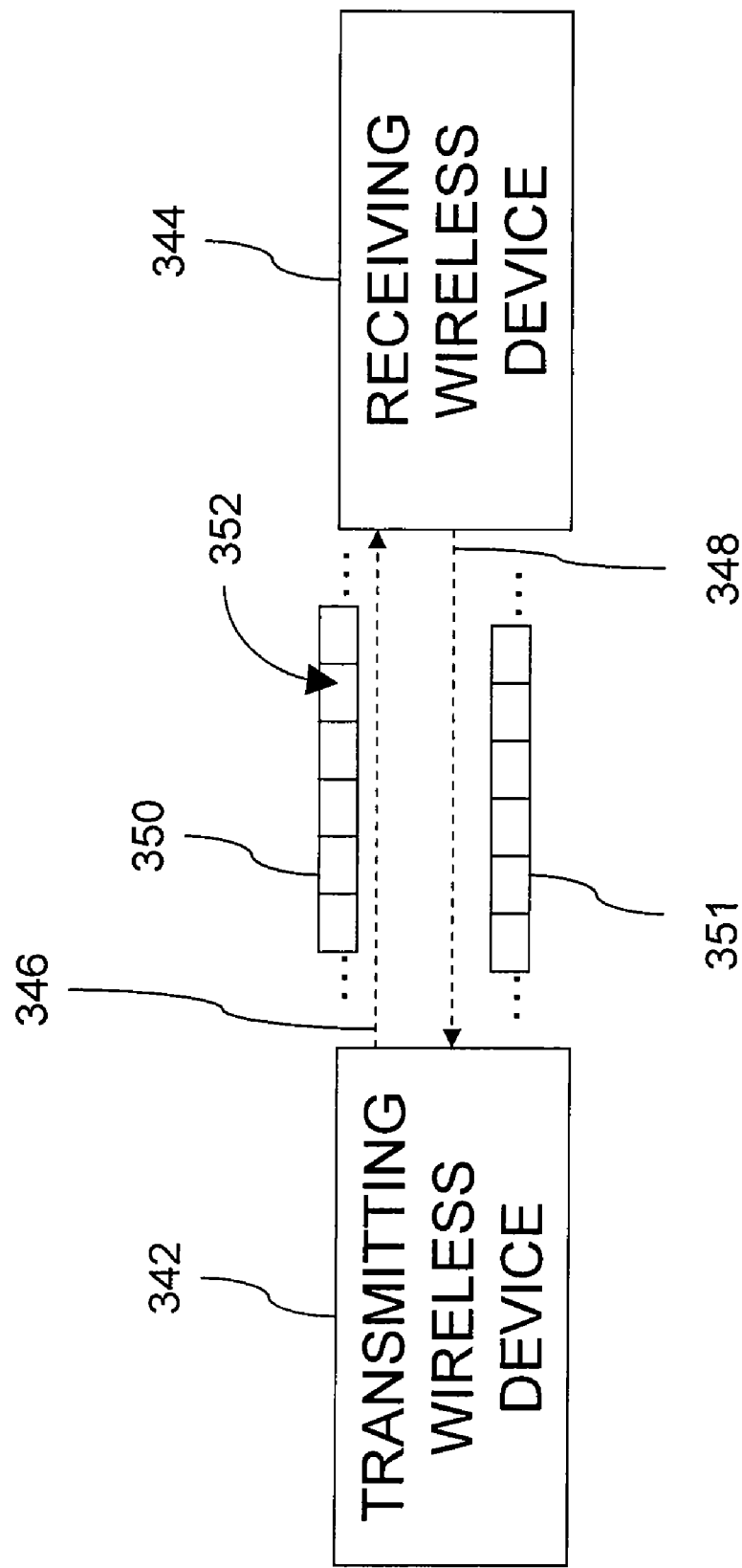
FIG. 3 depicts frames being transmitted from a transmitting wireless device to a receiving wireless device.

Wireless devices such as wireless device 200 transmit and receive data via signals containing frames. An example is shown in FIG. 3, where communications example 300 includes a transmitting device 342 and a receiving device 344. Transmitting device 342 may be, for example, a portable wireless device, such as a laptop 102, or an access point device such as access point 104. Receiving device 344 may also be a portable wireless device or an access point device. Transmitting device 342 can generate a frame 350 to be sent to receiving device 344 as part of a wireless signal 346. Frame 350 may contain one or more subframes 352.

When receiving device 344 receives frame 350, it can generate a feedback frame 351 that is returned to transmitting device 342 as part of a wireless signal 348. Feedback frame 351 may provide status information regarding the reception of frame 350, including information related to the number of subframes 352 in frame 350 that have been successfully received by receiving device 344. This status information is useful in deciding whether transmitting device 342 should re-transmit the whole or partial frame 350. For example, if transmitting device 342 transmitted and then re-transmitted transmission frame 350 a number of times that exceeds a predetermined threshold, and does so at the current primary transmission rate (e.g., 78 Mbps), transmitting device 342 can then attempt to resend frame 350 at a lower transmission rate (e.g., 39 Mbps), known as the fallback rate. Frame 350, transmitted at the fallback rate, has a higher probability of being successfully received at receiving device 344. The status information is also useful in deciding at what rate future outgoing frame(s) should be sent. Transmission rates are chosen depending on channel conditions, and if the channel condition is poor, the transmission rate can be changed in an effort to reduce the error. However, the transmission rate chosen by conventional methods may not necessarily achieve optimal performance in regard to, for example, the throughput. The system and method embodiments described below address this shortcoming.

Throughput-Based Rate Adaptation—Exemplary System and Procedure

In the following description, an exemplary system and an exemplary procedure for throughput-based rate adaptation for wireless transmissions are presented. The exemplary system will be described first with reference to FIGS. 4 and 5.

Figure 4:
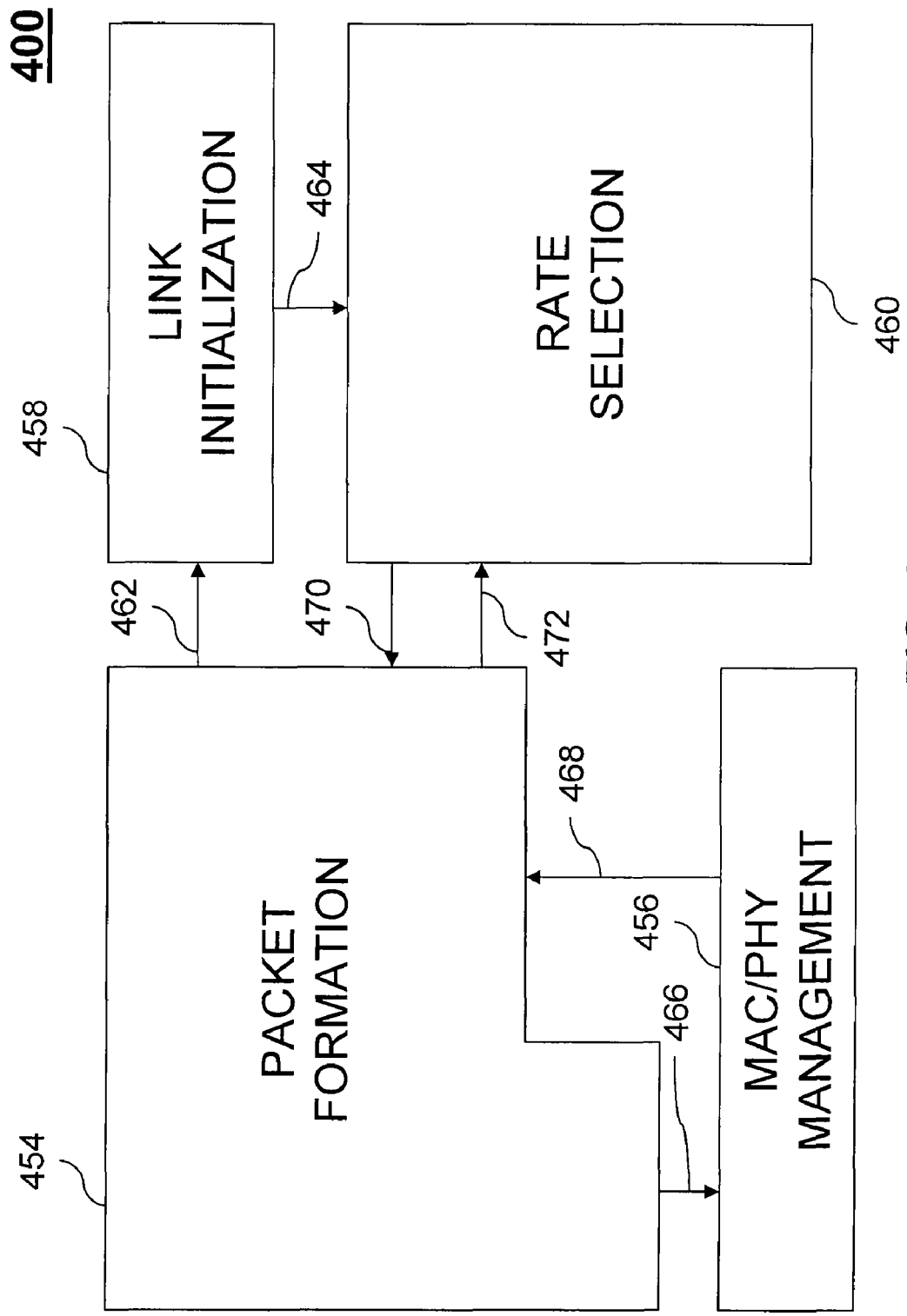
FIGS. 4 and 5 illustrate a transmission rate selection system, according to embodiments of the present invention.

FIG. 4 illustrates a transmission rate selection system 400, according to an embodiment of the present invention. System 400 includes a packet formation module 454, a MAC/PHY management module 456, a link initialization module 458, and a rate selection module 460. Although modules 454, 456, 458, and 460 are herein described as four separate modules, they are representative of their respective functionalities and are not to be limited to four modules. Modules 454, 456, 458, and 460 may actually exist as a combination of fewer or more modules. For example, initialization module 458 may actually be a part of rate selection module 460. Any, some, or all of modules 454, 456, 458, and 460 may be located within CPU 210 of wireless device 200, or located outside of CPU 210 as one or more of elements 220, for example. Modules 454, 456, 458, and 460, their respective functions and their relations with each other will be described below.

Packet formation module 454 handles the wrapping and aggregation of transmission frames 352, determines transmission instructions associated with each frame, and passes the completed frames and transmission instructions to the MAC/PHY management module 456 (shown by arrow 466) for transmission.

Figure 5:
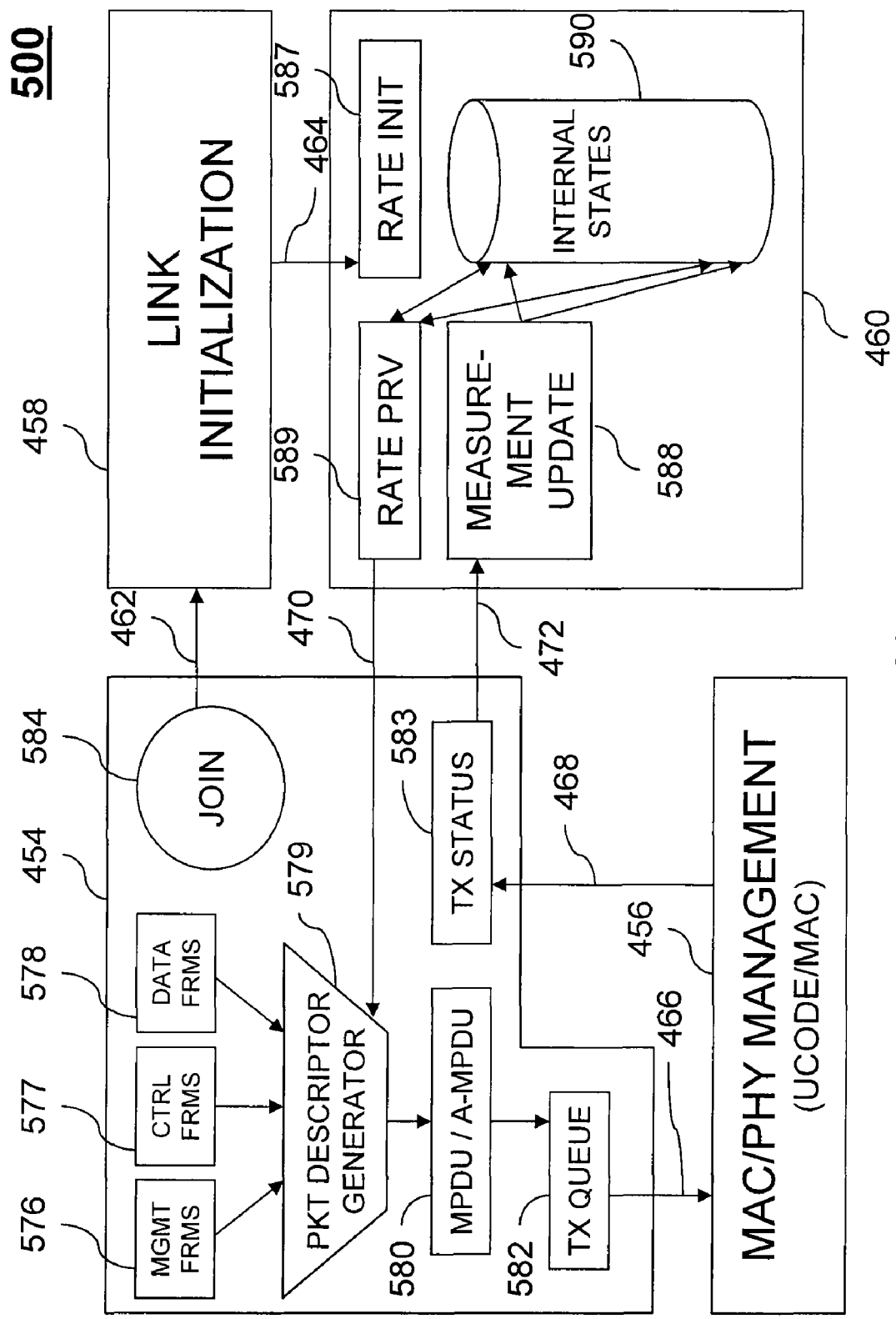

FIG. 5 illustrates a transmission rate selection system 500, which is representative of one embodiment of transmission rate selection system 400. As shown in more detail in FIG. 5, packet formation module 454 includes a packet descriptor generator 579 that prepares various types of frames including management frames 576, control frames 577, and data frames 578, for transmission, providing specific transmission instructions for each. The frames are wrapped into lower level format MPDU to be transmitted individually, or are further aggregated to be transmitted in a bigger frame A-MPDU, at MPDU/A-MPDU module 580. The MPDU and A-MPDU are put into transmit queue 582 and are eventually passed to the MAC/PHY management module 456 for transmission.

After completing the transmission, the MAC/PHY management module 456 generates a report of the transmission result, either by means of receiving a feedback frame from the receiving device (such as feedback frame 351 from receiving device 344 in FIG. 3) or by means of a time-out mechanism that allows a maximum amount of waiting time for the feedback frame. The report is provided to transmission status block 583 in packet formation module 454 (shown by arrow 468). Packet formation module 454 can then use the transmission status information for retransmissions and updating transmission instructions for subsequent frame transmissions in an effort to improve communications efficiency between transmitting device 342 and receiving device 344. One example of updating transmission instructions is changing the rate of transmission, which will be briefly described below.

Packet formation module 454 requests an initialization of the rate selection via the link initialization module 458 (shown by arrow 462). As shown in FIG. 5, a link-up function 584 from packet formation module 454 initiates an initialization by calling the link initialization function 458, which subsequently incurs a rate initialization 587 in the rate selection module 460 (shown by arrow 464).

The rate selection module 460 also includes a measurement update module 588, a rate providing module 589, and a database 590. The measurement update module 588 gathers the current measurement from the transmission status provided by the transmission status sub-module 583 (shown by arrow 472). The rate selection module 460 uses this measurement to update internal states stored in database 590, and determines the optimal transmission rate to be used for subsequent frame transmission. The rate, if updated, is provided to the packet formation module 454 (shown by arrow 470). The procedure to determine the optimal transmission rate will be described in detail below.

Figure 6:
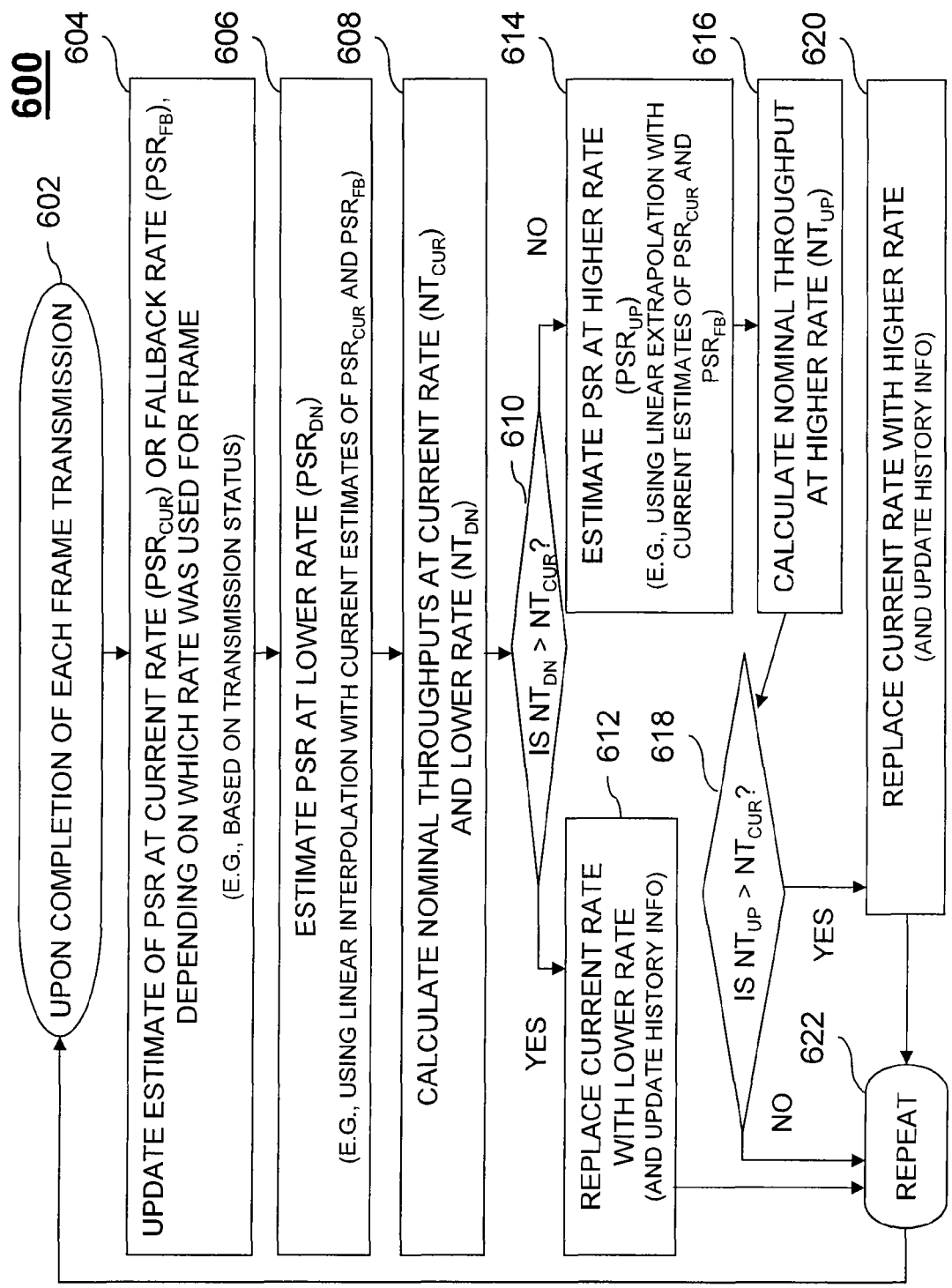
FIG. 6 illustrates a flowchart describing a method of transmission rate selection, according to an embodiment of the present invention.

In an embodiment, rate providing module 589 can use procedure 600, shown in FIG. 6, for determining the optimal transmission rate. It is assumed that each frame is transmitted or retransmitted up to a predefined threshold or until the feedback frame 351 confirms that it has been received by receiving device 344; that the frame is first transmitted at the current rate; and, after reaching a preconfigured threshold, is retransmitted at a lower rate, termed as the fallback rate. Upon completion of each frame transmission (602), the current transmission result is used at step 604 to update the estimate of packet success rates (PSRs) (i.e., a percentage of the number of successful transmissions per number of total transmissions, equal to 1–PER) at the rate at which the frame was transmitted. Depending on whether the frame was transmitted at the current rate or the fallback rate (provided in the transmission status information 583), the estimates are denoted as $PSR_{CUR}$ or $PSR_{FB}$, respectively. In an embodiment, packet success rates $PSR_{CUR}$ and $PSR_{FB}$ can each be estimated using an exponential moving average such as that shown in Equation 794 of FIG. 7, along with history information and transmission status information. The exponential moving average assigns different weighting factors for old and new data points—the former decreases exponentially, giving more importance to recent observations while fading out older observations gradually. In Equation 794, $$PSR_n = \beta * PSR_{n-1} + (1-\beta) * PSR_t$$

where $PSR_n$ represents a new packet success rate estimate (for either the current rate or the fallback rate), where n is an estimate number counter that starts from zero and is reset to zero when the current rate is replaced with a new transmission rate;

$\beta$ represents an aging factor between 0 and 1, where $(1-\beta) = 2^{-\alpha}$, and where $\alpha$ is a first value ($\alpha_0$) if n is smaller than a predetermined value, and $\alpha$ is a second value ($\alpha_1$) if n is larger than or equal to the predetermined value. The values of $\alpha_0$, $\alpha_1$, and the predetermined threshold value of n are preconfigured and can be changed if desired;

$PSR_{n-1}$ represents a previous packet success rate estimate; and $PSR_t$ represents a current packet success rate measurement for the most recent frame transmission that is equal to a ratio of the number of successful packet transmissions and the total number of packet transmissions, multiplied by $2^{NF}$, where NF is a normalization factor. If the frame is an A-MPDU, then the transmission of each subframe is counted as one transmission. This can be shown as:

$$PSR_t = (SUCCESSFUL/TOTAL) * 2^{NF}$$

The above example is just one instantiation of performing the PSR estimation. Other manners of performing this estimation can be used without detracting from the present invention.

Referring back to procedure 600 of FIG. 6, in step 606, a PSR at another transmission rate (e.g., at a lower transmission rate ($PSR_{DN}$)) is estimated. The lower rate can be any rate lower than the current rate. In an embodiment, $PSR_{DN}$ can be estimated using linear interpolation from the current values of $PSR_{CUR}$ and $PSR_{FB}$ as demonstrated in chart 895 of FIG. 8A.

In step 608, a nominal throughput at the current rate is determined as $NT_{CUR}$, and a nominal throughput at the lower (or down) rate is determined as $NT_{DN}$. In one embodiment, the nominal throughput is determined using (PSR*transmission rate). However, there can be other elaborated ways of determining the nominal throughput, and they can be used without detracting from the present invention.

In step 610, it is determined whether $NT_{DN}$ is greater than $NT_{CUR}$. If $NT_{DN}$ is greater than $NT_{CUR}$, then the current rate is replaced with the lower rate (in step 612). At that point, the current estimates of PSR are updated, along with other relevant transmission status and history information. The procedure then can proceed to step 622, where the procedure repeats starting back at step 602.

In step 610, if $NT_{DN}$ is not greater than $NT_{CUR}$, then the procedure proceeds to step 614. In step 614, a PSR at another transmission rate (e.g., at a higher transmission rate ($PSR_{UP}$)) is estimated. The higher rate can be any rate higher than the current rate. In an embodiment, $PSR_{UP}$ can be estimated using linear extrapolation with the current values of $PSR_{CUR}$ and $PSR_{FB}$ as demonstrated in chart 896 of FIG. 8B.

In step 616, a nominal throughput at the higher rate, $NT_{UP}$, is determined in a manner similar to the way $NT_{DN}$ is determined.

In step 618, it is determined whether $NT_{UP}$ is greater than $NT_{CUR}$. If $NT_{UP}$ is greater than $NT_{CUR}$, then the current rate is replaced with the higher rate (in step 620). At that point, the current estimates of PSR are updated, along with other relevant transmission status and history information. The procedure then can proceed to step 622, where the procedure repeats starting back at step 602. If $NT_{UP}$ is not greater than $NT_{CUR}$, then the procedure proceeds directly to step 622 where the procedure repeats starting back at step 602.

In steps 612 and 620, the history information can be stored. An example can be found in FIGS. 9A and 9B. Chart 997 of FIG. 9A shows the PSR estimates that can be updated if the current rate is increased. In this example, the value of $PSR_{UP}$ is assigned to the value of the new $PSR_{CUR}$, and the value of $PSR_{DN}$ is assigned to the value of the new $PSR_{FB}$. Similarly, chart 998 of FIG. 9B shows the PSR estimates that can be updated if the current rate is decreased. In this example, the value of $PSR_{CUR}$ is assigned to the new $PSR_{UP}$, the value of $PSR_{DN}$ is assigned to the new $PSR_{CUR}$, and the value of $PSR_{FB}$ is assigned to the new $PSR_{DN}$. Updating these PSR values improves the future PSR estimates such as those estimated using Equation 794 shown in FIG. 7.

It will be understood by one skilled in the relevant art(s) that the example shown and described above in reference to FIG. 6 is one instantiation of the present invention and that other examples can be realized based on the description herein without detracting from the present invention. For example, the embodiment shown in FIG. 6 serially compares the nominal throughput at the current rate with that of other rates until a nominal throughput of another rate is found to be higher. In an alternative embodiment, the nominal throughputs at transmission rates in a candidate rate set can be simultaneously compared to determine if the highest nominal throughput of the set is higher than the nominal throughput at the current rate. In this embodiment, the transmission rate of the candidate rate set that has the highest nominal throughput is chosen as the adapted transmission rate. In another example embodiment, the transmission rate of the candidate rate set that has the highest nominal throughput out of the rates that also have a PSR at or above a predetermined threshold can be chosen as the adapted transmission rate.

Exemplary Methods

FIGS. 10-14 depict exemplary methods that can be used for throughput-based transmission rate adaptation, according to embodiments of the present invention. These methods are similar to the process shown in FIG. 6. However, they are written in a more generalized manner.

Figure 10:
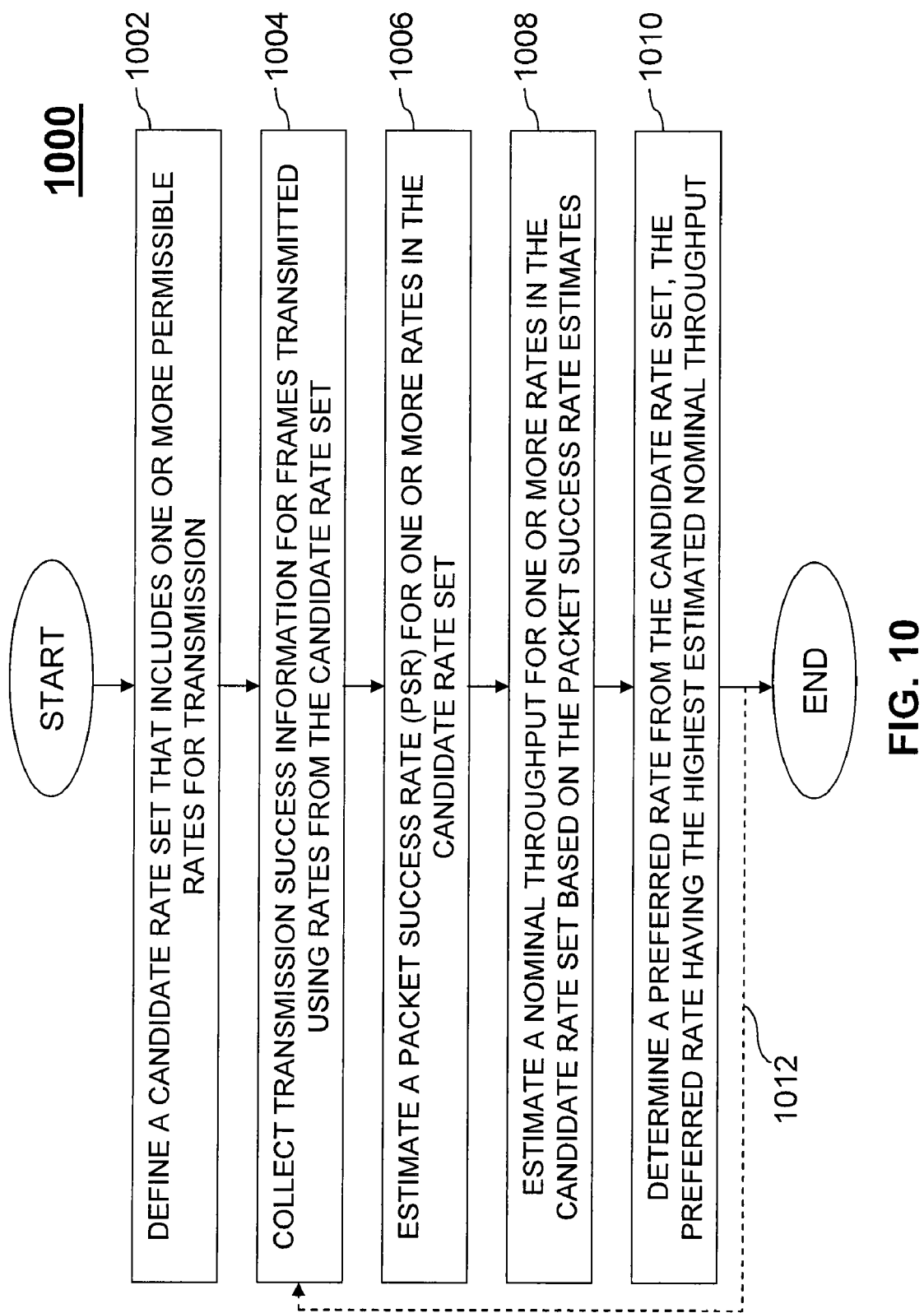
FIG. 10 is a flowchart depicting a method of transmission rate adaptation for wireless transmissions, according to an embodiment of the present invention.
Figure 11:
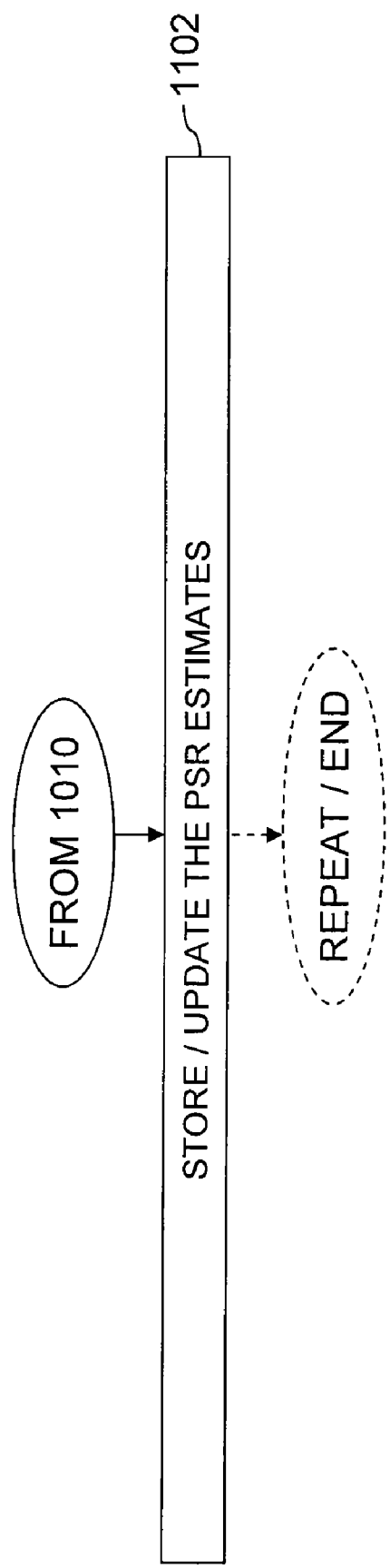
FIGS. 11 and 12 are flowcharts depicting further optional steps of the method shown in FIG. 10.
Figure 12:
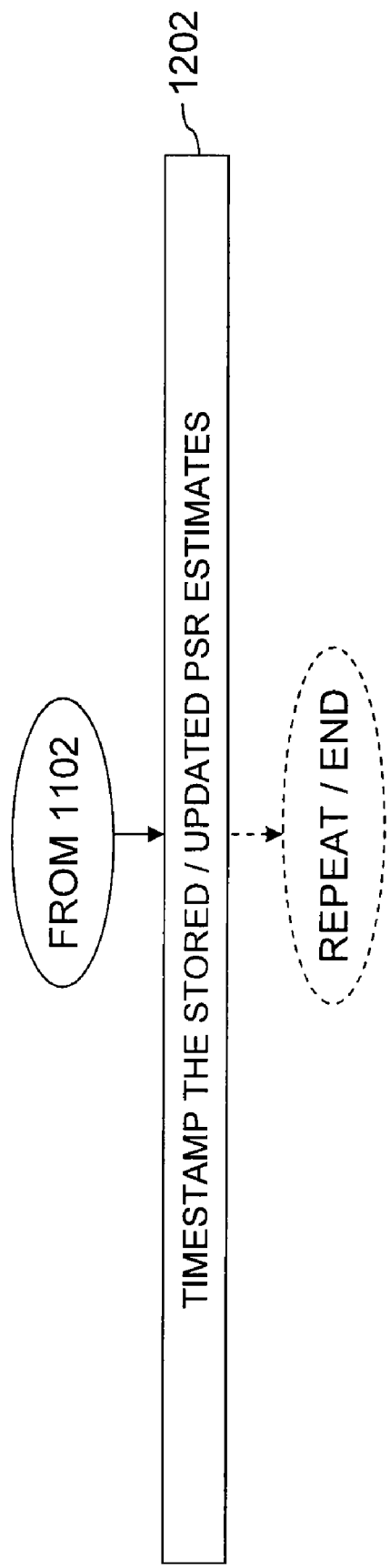

The flowcharts depicted in FIGS. 10-12 focus on the transmission rate determination executed by, for example, rate providing module 589 in FIG. 5. These flowcharts focus on the use of PSR estimates. FIG. 10 depicts a method 1000 of transmission rate adaptation for wireless transmissions, according to an embodiment of the present invention. FIGS. 11 and 12 are flowcharts depicting further and/or optional steps of the method shown in FIG. 10.

In step 1002 of method 1000, a candidate rate set is defined to include one or more permissible rates for transmission. The candidate rate set can be defined as part of the method, or it can be predefined. In step 1004, transmission success information is collected for frames transmitted using rates from the candidate rate set. In step 1006, a packet success rate (PSR) is estimated for one or more rates of the candidate rate set. In embodiments, one or more of the PSR estimates of step 1006 can be determined using, for example, Equation 794 of FIG. 7, or linear interpolation or extrapolation as shown in FIGS. 8A and 8B.

In step 1008, a nominal throughput for one or more rates in the candidate rate set is estimated based on the packet success rate estimates. In step 1010, a preferred rate from the candidate rate set is determined. The preferred rate is the rate having the highest estimated nominal throughput. In an embodiment, the preferred rate replaces the current rate if the estimated nominal throughput of the preferred rate is higher than the nominal throughput of the current rate. In one embodiment, the preferred rate is determined to be the rate in the candidate rate set having the highest estimated nominal throughput out of the rates having a PSR estimate at or above a predefined threshold. In an embodiment, method 1000 can be repeated for subsequent frame transmissions starting at step 1004, as shown by dashed arrow 1012.

Method 1000 can also include step 1102 shown in FIG. 11. In step 1102, the PSR estimates determined in method 1000 are stored or updated. The PSR estimates can be stored or updated in database 590, for example, and used to improve future PSR estimates.

Method 1000 can also include step 1202 shown in FIG. 12. In step 1202, which stems from step 1102, the stored or updated PSR estimates can be time-stamped in order to tell how old the PSR estimates are. When determining future PSR estimates, the timestamp of each stored PSR can be checked to make a determination as to whether the stored PSR estimate is too old to be used in determining the new PSR estimate. For this determination, an age threshold can be preconfigured, for example, and can be updated if desired.

Figure 13:
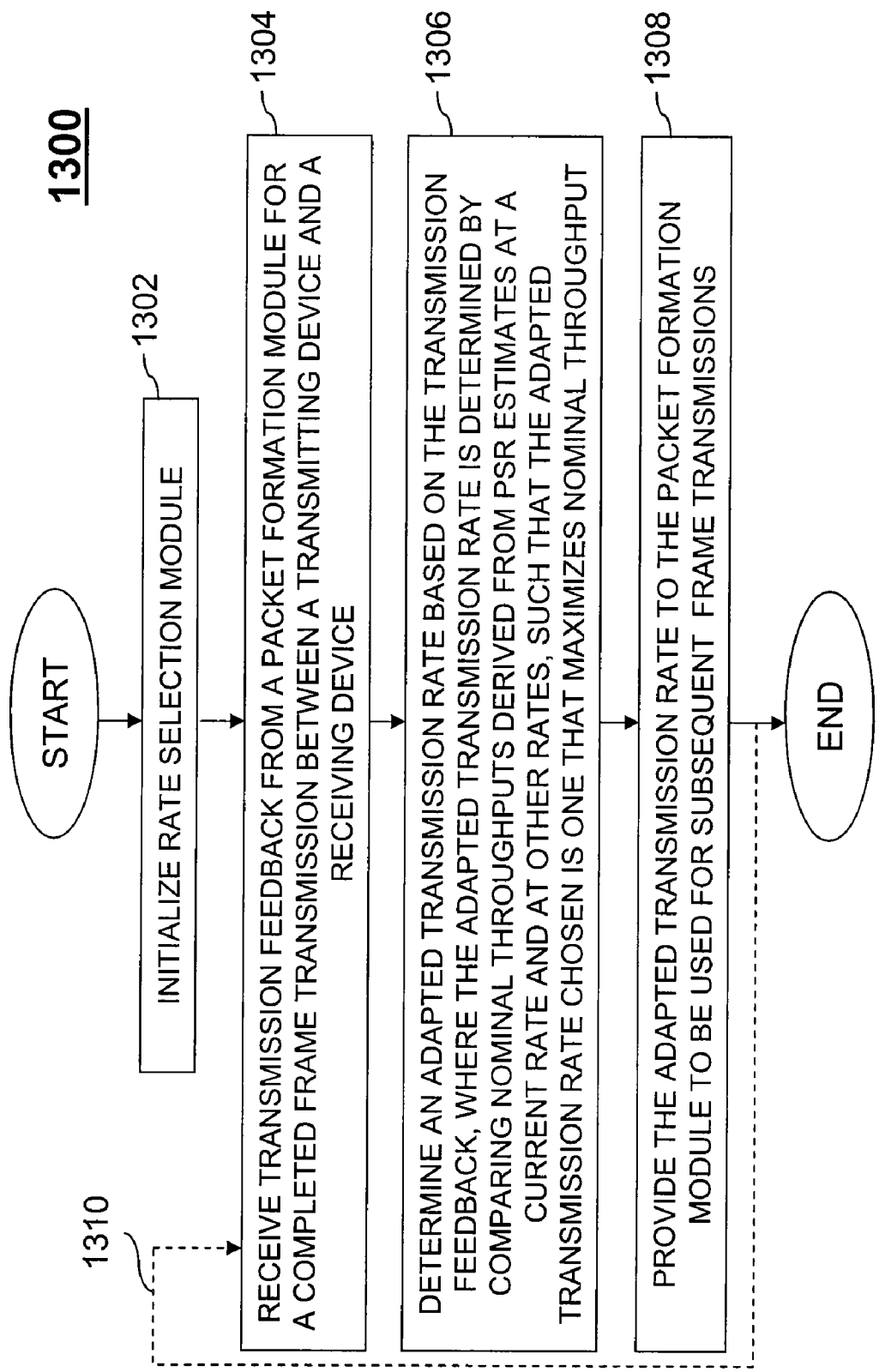
FIG. 13 is a flowchart depicting a method of transmission rate adaptation for wireless transmissions from the perspective of a rate selection module, according to an embodiment of the present invention.

FIG. 13 is a flowchart depicting a method 1300 of transmission rate adaptation for wireless transmissions from the perspective of a rate selection module (e.g., rate selection module 460), according to an embodiment of the present invention. In step 1302 of method 1300, the rate selection module is initialized (e.g., with an initial transmission rate). In step 1304, transmission feedback is received from a packet formation module for a completed frame transmission between a transmitting device and a receiving device. In step 1306, an adapted transmission rate is determined based on the transmission feedback. The adapted transmission rate is determined by comparing nominal throughputs derived from PSR estimates at a current transmission rate and at other rates, such that the adapted transmission rate chosen is one that maximizes the nominal throughput. In step 1308, the adapted transmission rate is provided to the packet formation module to be used for subsequent frame transmissions. Method 1300 can be repeated upon the completion of each frame transmission, as shown by dashed arrow 1310, starting back at step 1304.

Further Embodiments, Features, and Advantages

A system and method of throughput-based transmission rate adaptation for wireless transmissions is provided herein. An adapted transmission rate is determined by comparing nominal throughputs derived from the packet success rate estimate at the current rate and at other rates, such that the adapted transmission rate chosen is the one that maximizes the nominal throughput. The determination of the adapted transmission rate can take transmission feedback from a previous frame transmission into account, and can use history data, including previous packet success rate estimates, to improve upon future packet success rate estimates, and to ultimately optimize the transmission rate used. This invention optimizes wireless communications in both clean environments as well as environments where wireless interfering signals are present. Using this invention, the transmission rate is dynamically adjusted to current environmental conditions. This invention can be applied in any multi-rate link layer on top of any feedback-based wireless medium access.

Numerous embodiments other than those described herein are possible. For example, the modules described in FIGS. 4 and 5 may be represented as a fewer or a greater number of modules that in essence provide the same functionality. Or, other methods or equations could be used to estimate the various PSRs. Or, there might be exceptional circumstances in which one does not want to raise or lower a transmission rate. Various thresholds and/or tunable parameters can be set, for example, to set exponential moving average parameters and thresholds, to set maximum cache time for history data, and/or to set thresholds to limit transmission rates to maximum and/or minimum rates. Further, there are numerous ways in which an initial transmission rate can be chosen, including using received signal strength indication (RSSI) data. Still further, for the algorithms used here, one might want the algorithm parameters to be adjustable (e.g., dynamically) based on whether any adjacent channel interference mitigation state is detected.

As will be appreciated by persons skilled in the relevant art(s), the system(s) and method(s) described here represent only a few possible embodiments of the present invention. Many of the elements described herein could, in alternative embodiments of the present invention, be configured differently within the scope and spirit of the present invention. In addition, additional elements, or a different organization of the various elements, could still implement the overall effect and intent of the present system and method. Therefore, the scope of the present invention is not limited by the above disclosure and detailed embodiments described therein, but rather is determined by the scope of the appended claims.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of frame transmission rate adaptation for wireless transmissions between two wireless devices, comprising:

defining, in a wireless device, a candidate rate set that includes one or more permissible rates for transmission;

collecting, in the wireless device, transmission success information for frames transmitted using rates from the candidate rate set;

estimating, in the wireless device, a packet success rate for one or more rates in the candidate rate set;

estimating, in the wireless device, a nominal throughput for one or more rates in the candidate rate set based on the estimated packet success rate; and choosing, in the wireless device, a preferred rate from the candidate rate set, the preferred rate having the highest estimated nominal throughput.

2. The method of claim 1, further comprising:
repeating the collecting through determining steps.

3. The method of claim 1, wherein the estimating the packet success rate comprises:
determining a ratio of a number of successful frame transmissions to a total number of frame transmissions.

4. The method of claim 3, wherein the number of successful frame transmissions includes each subframe transmission that is acknowledged by a receiving device.

5. The method of claim 1, wherein estimating the packet success rate comprises:
estimating the packet success rate at a current rate; and
estimating the packet success rate at a fallback rate.

6. The method of claim 1, wherein the estimating the packet success rate is based on a most recent estimated packet success rate at a current rate and at a fallback rate.

7. The method of claim 6, wherein the estimating the packet success rate is based on one of interpolation and extrapolation using the most recent estimated packet success rate at the current rate and at the fallback rate.

8. The method of claim 1, further comprising:
storing the estimated packet success rate.

9. The method of claim 8, further comprising:
updating stored packet success rate after each transmission.

10. The method of claim 9, further comprising:
timestamping a latest update time for each update of the stored packet success rate.

11. The method of claim 9, wherein the estimating the packet success rate uses the stored packet success rate when a corresponding update time is earlier than a predetermined age.

12. The method of claim 1, wherein the estimating the packet success rate for a rate at which a frame was transmitted follows equation $$PSR_n = \beta * PSR_{n-1} + (1-\beta) * PSR_t$$

where $PSR_n$ represents a new packet success rate estimate, n is an estimate number counter that starts from zero and is reset to zero when a current rate changes, β represents an aging factor between 0 and 1, where $(1-\beta)=2^{-\alpha}$, $\alpha$ is a first value if n is smaller than a predetermined value, and $\alpha$ is a second value if n is larger than or equal to the predetermined value, $PSR_{n-1}$ represents a previous packet success rate estimate, and $PSR_t$ represents a current packet success rate measurement that is equal to a ratio of a total number of successful transmissions and a total number of transmissions, multiplied by $2^{NF}$, NF being a normalization factor.

13. The method of claim 12, further comprising:
adjusting one or more of the predetermined value of n, the first value of $\alpha$, and the second value of $\alpha$ based on a detected state of any adjacent channel interference.

14. The method of claim 1, wherein the determining step includes determining the preferred rate as the rate from the candidate rate set that has the highest estimated nominal throughput constrained with one or more conditions to meet one or more quality of service requirements.

15. The method of claim 1, wherein the determining includes determining the preferred rate as the rate from the candidate rate set that has the highest estimated nominal throughput out of the rates that have an estimated packet success rate at or above a predefined threshold.

16. A system for frame transmission rate adaptation for wireless transmissions between two wireless devices, comprising:
a packet formation unit configured to form frames and to generate transmission instructions for transmitting the frames;
a MAC/PHY management unit, in communication with the packet formation unit, configured to manage frame transmission, and to provide transmission status feedback to the packet formation unit; and
a rate selection unit, in communication with the packet formation unit, configured to determine an adapted transmission rate from a candidate rate set including rates for transmission based on nominal throughputs estimated from previous frame transmissions associated with the rates, and to provide the adapted transmission rate to the packet formation unit.

17. The system of claim 16, wherein the rate selection unit is configured to
collect transmission success information for frames transmitted using rates from the candidate rate set;
estimate a packet success rate for one or more rates in the candidate rate set;
estimate a nominal throughput for one or more rates in the candidate rate set based on the estimated packet success rate; and
determine the adapted transmission rate from the candidate rate set, the adapted transmission rate having the highest estimated nominal throughput.

18. The system of claim 17, further comprising:
a data storage unit configured to store current values of the estimated packet success rate for one or more rates in the candidate rate set.

19. The system of claim 18, wherein the data storage unit is further configured to store timestamped data for each of the stored packet success rate.

20. The system of claim 17, wherein the rate selection unit is configured to estimate the packet success rate for a rate at which a frame was transmitted using equation $$PSR_n = \beta * PSR_{n-1} + (1-\beta) * PSR_t$$

where $PSR_n$ represents a new packet success rate estimate, n is an estimate number counter that starts from zero and is reset to zero when a current rate changes, $\beta$ represents an aging factor between 0 and 1, where $(1-\beta)=2^{-\alpha}$, $\alpha$ is a first value if n is smaller than a predetermined value, and $\alpha$ is a second value if n is larger than or equal to the predetermined value, $PSR_{n-1}$ represents a previous packet success rate estimate, and $PSR_t$ represents a current packet success rate measurement that is equal to a ratio of a total number of successful transmissions and a total number of transmissions, multiplied by $2^{NF}$, NF being a normalization factor.

21. The system of claim 20, wherein one or more of the predetermined value of n, the first value of $\alpha$, and the second value of $\alpha$ are adjusted based on a detected state of any adjacent channel interference.

22. The system of claim 17, wherein the rate selection unit is configured to replace a current rate with the rate from the candidate rate set that has the highest nominal throughput out of the rates that have an estimated packet success rate at or above a predefined threshold.

23. A system for wirelessly transmitting and receiving frames, comprising:
a transmitting device configured to transmit frames wirelessly, the transmitting device having
a packet formation module configured to form frames and to generate transmission instructions for transmitting the frames;
a MAC/PHY management module, in communication with the packet formation module, configured to manage frame transmission, and to provide transmission status feedback to the packet formation module;
a rate selection module, in communication with the packet formation module, configured to determine an adapted transmission rate from a candidate rate set including rates for transmission based on nominal throughputs estimated from previous frame transmissions associated with the rates, and to provide the adapted transmission rate to the packet formation module; and
a receiving device configured to receive the frames wirelessly from the transmitting device, and to provide the transmission status feedback regarding the received frames to the transmitting device.

24. A method of frame transmission rate adaptation for wireless transmissions between a transmitting device and a receiving device, the method comprising:
initializing a rate selection module;
receiving transmission feedback from a packet formation module for a completed frame transmission between the transmitting device and the receiving device;
determining an adapted transmission rate based on the transmission feedback, wherein the adapted transmission rate is determined by comparing nominal throughputs derived from packet success rate estimates at a current rate and at other rates, such that the adapted transmission rate chosen is one that maximizes nominal throughput; and
providing the adapted transmission rate to the packet formation module to be used for subsequent frame transmissions.

25. The method of claim 24, further comprising:
repeating the receiving, determining, and providing for subsequent frame transmissions.

26. The method of claim 24, further comprising:
storing the packet success rate estimates at the current rate and at other rates for use in determining future packet success rate estimates.

27. The method of claim 26, further comprising:
timestamping a latest update time for the stored packet success rate estimates.

28. The method of claim 27, wherein the determining uses one or more of the stored packet success rate estimates when corresponding update times are earlier than a predetermined age.

29. The method of claim 24, wherein the determining the adapted transmission rate comprises:
collecting transmission success information for frames transmitted using rates from a candidate rate set that includes one or more permissible rates for transmission;
estimating a packet success rate for one or more rates in the candidate rate set;
estimating a nominal throughput for one or more rates in the candidate rate set based on the estimated packet success rate; and
determining the adapted transmission rate from the candidate rate set, the adapted transmission rate having the highest estimated nominal throughput.

30. The method of claim 29, wherein the estimating the packet success rate for one or more rates in the candidate rate set is based on one of interpolation and extrapolation using a most recent estimated packet success rate at the current rate and at a fallback rate.

31. The method of claim 29, wherein the estimating the packet success rate for a rate at which a frame was transmitted follows equation $$PSR_n = \beta * PSR_{n-1} + (1-\beta) * PSR_t$$

where $PSR_n$ represents a new packet success rate estimate, n is an estimate number counter that starts from zero and is reset to zero when the current rate changes, $\beta$ represents an aging factor between 0 and 1, where $(1-\beta)=2^{-\alpha}$, $\alpha$ is a first value if n is smaller than a predetermined value, and $\alpha$ is a second value if n is larger than or equal to the predetermined value, $PSR_{n-1}$ represents a previous packet success rate estimate; and $PSR_t$ represents a current packet success rate measurement that is equal to a ratio of a total number of successful transmissions and a total number of transmissions, multiplied by $2^{NF}$, NF being a normalization factor.

32. The method of claim 31, further comprising:
adjusting one or more of the predetermined value of n, the first value of $\alpha$, and the second value of $\alpha$ based on a detected state of any adjacent channel interference.

33. The method of claim 29, wherein the determining includes determining the adapted transmission rate as the rate from the candidate rate set that has the highest estimated nominal throughput out of the rates that have an estimated packet success rate at or above a predefined threshold.

* * * * *